United States Patent
Blake et al.

[11] Patent Number: 6,062,739
[45] Date of Patent: May 16, 2000

[54] FIBER OPTIC CONNECTOR

[75] Inventors: David R. Blake, Northorough; Brian D. Morrison, Hopkington; Randolph W. Holtgrefe, Shrewsbury, all of Mass.

[73] Assignee: Raytheon Company, Lexington, Mass.

[21] Appl. No.: 09/121,634

[22] Filed: Jul. 23, 1998

Related U.S. Application Data

[60] Provisional application No. 60/053,808, Jul. 25, 1997.

[51] Int. Cl.$^7$ ...................................................... G02B 6/36
[52] U.S. Cl. .................................. 385/76; 385/56; 385/60
[58] Field of Search .................................. 385/76, 58, 60, 385/70, 72, 56

[56] References Cited

U.S. PATENT DOCUMENTS

| | | | |
|---|---|---|---|
| 4,432,879 | 2/1984 | Lee | 385/60 |
| 4,699,455 | 10/1987 | Erbe et al. | 350/96.2 |
| 5,179,607 | 1/1993 | Sellers et al. | 385/70 |
| 5,289,554 | 2/1994 | Cubukciyan et al. | 385/76 |
| 5,325,455 | 6/1994 | Henson et al. | 385/89 |
| 5,428,703 | 6/1995 | Lee | 385/78 |
| 5,432,879 | 7/1995 | Lee | 385/60 |

FOREIGN PATENT DOCUMENTS

| | | | |
|---|---|---|---|
| 0 156 075 A2 | 10/1985 | European Pat. Off. | G02B 6/38 |
| 0 290 964 A2 | 11/1988 | European Pat. Off. | G02B 6/38 |
| 0 366 346 A2 | 5/1990 | European Pat. Off. | G02B 6/38 |
| 0 423 581 A2 | 4/1991 | European Pat. Off. | G02B 6/38 |

OTHER PUBLICATIONS

Rifocs Corp. Article entitled "D–6106 Series Simplex Fiber Optic Connector For Avionics and Aerospace Applications", Jan. 1995, 2 sheets.

Deutsch Ltd., Fibre Optic Products—Article entitled "(RSC) Ruggedised Singleway Connector", 4 sheets.

Military Specification Sheet entitled Connector, Plug, Fiber Optic, Single Terminus, Threaded, (Straight Nose Interface), Lensless, Epoxy . . . , 3 sheets (pp. 1–6).

*Primary Examiner*—Phan T. H. Palmer
*Attorney, Agent, or Firm*—Daly, Crowley, & Mofford, LLP

[57] ABSTRACT

A fiber optic connector assembly for mating an optical fiber to a receptacle includes an adapter and a plug separably coupled to the adapter. The adapter has a first end coupled to the receptacle with a first surface of the adapter contacting a surface of a housing wall through which the receptacle projects. A sealing member is disposed between the first surface of the adapter and the surface of the housing wall. In one embodiment the sealing member includes an O-ring groove provided in the first surface of the adapter and an O-ring disposed in the O-ring groove. The plug has an external surface with an alignment band formed on the external surface thereof. A first end of the plug is separably coupled to the second end of the adapter and a second end of the plug is adapted to receive the optical fiber. The connector assembly further includes a locking mechanism to prevent the plug from separating from the adapter in response to a vibration force.

23 Claims, 5 Drawing Sheets

FIBER OPTIC CONNECTOR

RELATED APPLICATIONS

This application claims priority under 35 U.S.C. §119(e) from application Ser. No. 60/053,808, filed Jul. 25, 1997.

GOVERNMENT RIGHTS

Not Applicable.

1. Field of the Invention

This invention relates to connectors and more particularly to fiber optic connectors.

2. Background of the Invention

As is known in the art, a fiber optic signal path refers to a signal path in which light acts as the information carrier and is propagated by total internal reflection through a transparent optical waveguide. Such signal paths are often used to transmit information from one electrical system to another. The systems require electro-optic modulators and opto-electric demodulators to convert the electrical signals into light and back again at the transmit and receive ends of the signal path.

Such fiber optic signal paths or links are used for data transmission when a shielded twisted pair or a coaxial cable fails to meet one or more required performance criteria of a system designer. To transmit data at relatively high rates or over relatively long distances, for example, silica fiber and 820 nanometer (nm) light-emitting diodes are often used. There is thus a growing trend to include fiber optics in commercial, military and aerospace systems.

As is also known, a fiber optic connector refers to a device that joins an optical fiber mechanically and optically to other optical fibers or to a terminal or signal port of apparatus and equipment at the ends of the fiber optic signal paths. Fiber optic connectors are fabricated in a wide range of types and sizes for different applications. The particular size and shape used in a particular application is selected in accordance with a variety of factors including but not limited to mechanical and environmental requirements. For example, severe environments, such as those which may be found to exist in an aircraft environment, may adversely effect signals passing through fiber optic connectors. Thus such applications require connectors which can withstand relatively severe environmental conditions.

One particular type of fiber optic connector is a so-called fiber optic "SMA" connector. An SMA designation indicates that the connector conforms to certain optical characteristics such as insertion loss characteristics as well as certain standard mechanical characteristics such as thread sizes and diameters of connector mating regions. Receptacles for accepting photo devices required to terminate and/or originate photonic energy in a fiber optic signal path commonly include a standard SMA compatible mating region. One problem with standard commercially available fiber-optic SMA connectors, however is that it is relatively difficult to ensure the mating integrity of fiber optic SMA connectors.

Furthermore, some systems, modules and circuit cards include multiple SMA connectors each of which should be coupled to one of multiple different fiber optic cables. In some applications, however, it is relatively difficult to determine which fiber optic cable properly mates to which connector due to the existence of multiple fiber optic cables and SMA connectors in a relatively small physical area . Standard SMA fiber optic connectors fail to include means, such as a key, to prevent mating with an incorrect SMA compatible receptacle. Thus, care must be taken when mating fiber optic cables and connectors in systems which include multiple cables, connectors and receptacles. This makes the connection process time consuming.

Another problem with SMA connectors arises due to vibration forces loosening a fiber optic signal path connector from a connection point. A loosened connector results in intermittent attenuation of the signal strength of a signal propagating through the connector. Furthermore, if the connector becomes totally disconnected from the connection point, the signal will be entirely prevented from propagating through the connector to a desired location.

One approach to overcoming the loosening connector problem is to utilize a so-called safety wire. In the safety wire approach, the fiber SMA connector is provided having an opening in a portion thereof. The safety wire is threaded through the SMA connector opening and through an opening in a mating receptacle or mounting structure to which the connector will be attached. The safety wire is then twisted or wound to thus tie the SMA connector to the mating receptacle or structure thereby preventing the SMA connector from loosening from the receptacle.

Some non-SMA type single fiber connectors include a ratchet mechanism which prevents the connector from separating from its mounting structure and also include alignment key to allow the connector to be coupled only to a receptacle having a mating keyhole. One problem with such connectors, however, is that they have a unique configuration and thus are not compatible with mechanical and optical characteristics of standard fiber optic SMA connectors. Since such connectors are specially designed, they are relatively expensive and typically cannot be used in more than one application or product. That is, it is necessary to incur connector design costs for each new application or product.

It would, therefore, be desirable to provide a fiber optic connector which is able to withstand severe vibration requirements while maintaining a relatively low insertion loss characteristic, a relatively low reflection loss characteristic and while providing a reliable connection. It would also be desirable to provide an SMA fiber optic connector which includes a key to prevent mis-mating the connector with a standard SMA compatible receptacle. It would further be desirable to provide a fiber optic connector which is fully compatible with the industry standard SMA style plugs and receptacles and which provides a visual indication of whether the connector is properly mated.

SUMMARY OF THE INVENTION

In accordance with the present invention, a fiber optic connector assembly includes an adapter and a plug. An internal surface of the adapter defines a bore extending from a first internally threaded end to a second externally threaded cylindrical end of the adapter with a keyway provided in the internal bore defining surface at the second end of the adapter. The plug has a first end with an internally threaded bore mateable to the external threads on the second end of the adapter and a second end mateable to an optical fiber. The plug includes a coupling nut housing having a first end with at least one alignment marker slot therein, an internal surface which defines a bore extending from the first end to a second end of the coupling nut housing and an external surface with an alignment band formed therein. The coupling nut housing also includes a stop member projecting from the internal surface into the bore. A coupling nut is disposed within the coupling nut housing for limited axial movement with respect to a longitudinal axis of the coupling nut housing. The axial movement of the coupling nut being limited in a direction toward the stop member by the stop member of the coupling nut housing. An internal surface of the coupling nut defines a bore with an internally threaded portion and an internal shoulder region. An external surface of the coupling nut has an external shoulder region and an alignment marker aligned with the alignment marker slot in the coupling nut housing. A ferrule assembly is disposed within the bore of the coupling nut. The ferrule assembly includes a ferrule projecting from the first end of the coupling nut, a ferrule assembly stop member for limiting the axial movement of the ferrule assembly in a direction toward the stop member of the coupling nut housing and a key projecting from a first surface of the ferrule assembly and disposed in the adapter keyway. A biasing member biases the connector nut toward the second end of the connector nut housing and a ferrule retaining member coupled to the ferrule assembly retains the ferrule assembly within the bore of the coupling nut.

With this particular arrangement, a fiber optic connector assembly that includes a visual alignment indicator is provided. The dimensions of the internal and external threads in the adapter and plug may be selected to be compatible with standard SMA connectors and receptacles. The connector assembly thus provides a means for mating optical fibers with industry standard SMA style plugs and receptacles while also providing a visual indication of whether the connector is properly mated. By maintaining compatibility with industry-standard SMA receptacle mounts, the connector assembly does not require special purpose, relatively expensive receptacles and thus provides a relatively inexpensive means for connecting an optical fiber to a standard SMA receptacle.

The adapter keyway accepts the key provided in the plug. In one embodiment the adapter and plug include at least four keying positions. In systems which include ports to which predetermined ones of multiple connectors must be attached, each adapter may be provided having a unique pattern of key slots and each plug may be provided having a corresponding key boss pattern. When the adapters are placed on ports, the unique key patterns prevent mismating of a connector to a port thereby lessening the time required to connect system components while simultaneously increasing the reliability of correctly coupling together system components.

The first end of the plug may be provided having a serrated edge which engages recesses formed in an external surface of the adapter to thus provide a ratchet means for locking the plug to the adapter in a fully mated position. The locking mechanism prevents the plug from separating from the adapter when the assembly is exposed to severe vibration forces and thus maintains the adapter and plug in the fully mated position when subjected to severe vibration requirements. The connector assembly of the present invention thus provides a relatively low-cost approach for allowing systems to employ relatively low-cost industry standard SMA style receptacles and packages in relatively high vibration environments.

The connector assembly of the present invention maintains compatibility with industry-standard photo diode receptacles which use SMA connector receptacles and utilizes a standard, reliable SMA ferrule. Thus the connector can use high-volume, relatively inexpensive SMA components, rather than low-volume, relatively expensive components such as specially fabricated aircraft-only receptacles. The connector of the present invention also includes an O-ring seal which prevents contaminants from entering the connector. The connector thus provides a vibration tolerant, user-friendly mating characteristic and a visual indication that the connector is fully mated insuring the lowest possible connector insertion loss characteristics and the most reliable physical connection. The connector assembly of the present invention may be used in any commercial, military or aerospace applications which utilizes a photonic device with an external interface and which has a high vibration environment.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Figure 1:
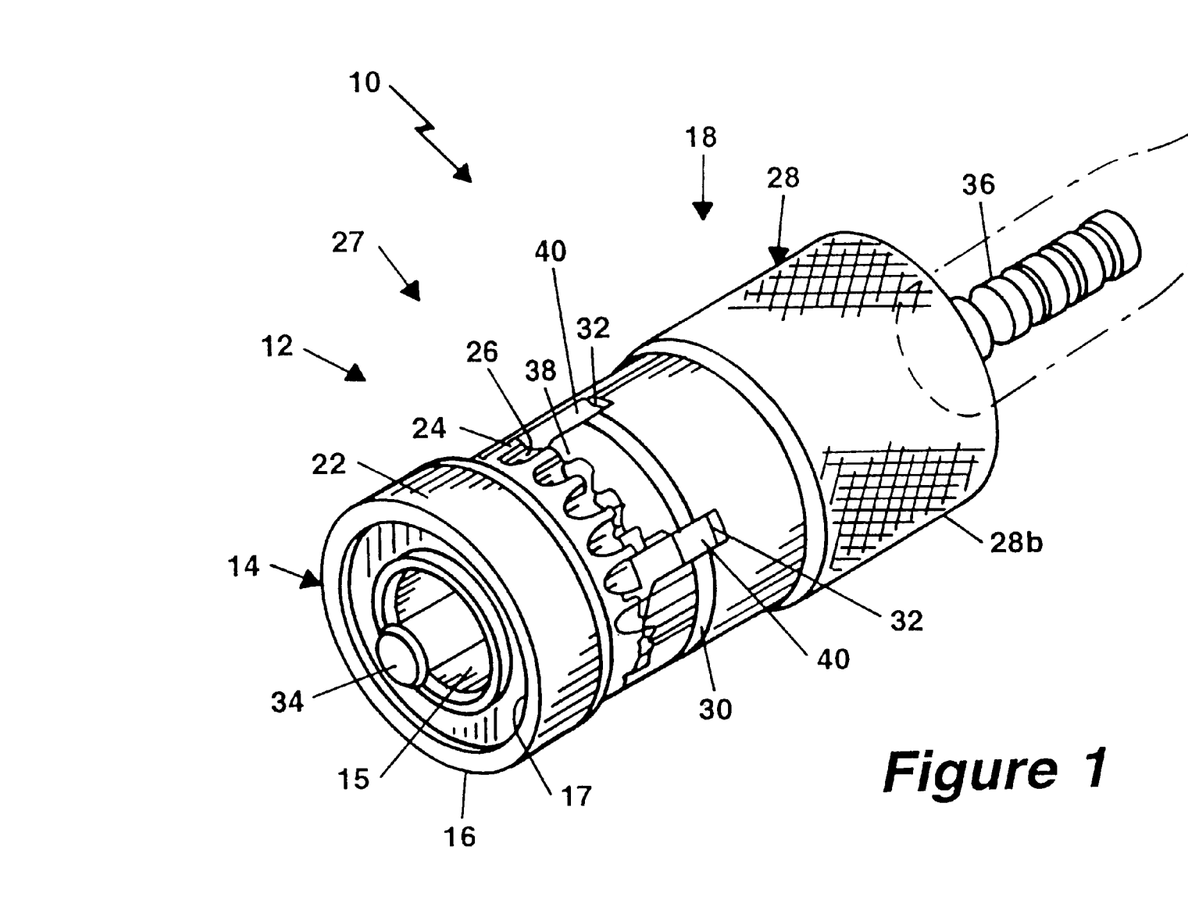
FIG. 1 is a perspective view of a fiber optic connector assembly.

Referring now to FIG. 1, a connector assembly 10 includes an adapter 12 having a bore 14 extending through the adapter 12 from a first end to a second end with a portion of bore 14 proximate the first end of adapter 12 having threads 15 formed therein. The diameter of bore 14 and spacing between threads 15 are selected such that adapter 12 mates with a complementary externally threaded fiber optic receptacle as will be described below in conjunction with FIGS. 2–4. The first end of adapter 12 defines an adapter mounting surface 16 having a groove 17 provided therein.

Before describing details of connector assembly 10 it should be appreciated that, in an effort to promote clarity, reference is sometimes made herein to connector assembly 10 being mated with an SMA fiber optic receptacle. Such reference should not be taken as limiting the present invention to use with only SMA type connectors and connector receptacles. Rather, the present invention finds application with any type of threaded connector which requires compatibility between mating portions of two signal path connectors or between a signal path connector and a terminating receptacle.

Accordingly, those of ordinary skill in the art will appreciate that the description and reference herein to SMA type connectors equally applies to FC-type, FC/PC-type or any other type of threaded connector. Likewise, the receptacles or modules described herein may be provided as optical modules, electrical modules or mechanical modules or any other type of module to which can be coupled a threaded connector.

A plug 18 coupled to the second end of adapter 12 accepts a conventional optical fiber 20. Optical fiber 20 is here shown in phantom sine it is not properly a part of the connector assembly 10. Thus, connector assembly 10 connects optical fiber 20 to an SMA fiber optic receptacle.

Adapter 12 includes an adapter housing 22 having a plurality of projecting members 24 which define notches or recesses 26 in a first outer surface of housing 22. Member 24 and recesses 26 together form an adapter engagement region 27. Plug 18 includes a coupling nut housing 28 having a first region 28a in which an alignment band 30 and a plurality of alignment marker slots 32 are formed and a second region 28b. If desired for ease of grasping, widened portion 28b maybe knurled on one surface as shown. A ferrule 34 projects from a first end of connector assembly 10 and a crimp-ring-accepting portion 36 of a ferrule housing projects from a second end of connector assembly 10 to engage a crimp ring of optical fiber 20.

A second end of coupling nut housing 28 has a serrated outer edge 37 which defines a plurality of teeth 38. With plug 18 coupled to adapter 12 in a manner to be described hereinbelow in conjunction with FIG. 3, teeth 38 engage recesses 26 formed in the edge of adapter 12. Thus, teeth 38 and recesses 26 form a ratchet locking structure or locking mechanism which prevents disengagement of plug 18 from adapter 12 due to vibrational, or other external forces.

Figure 1A:
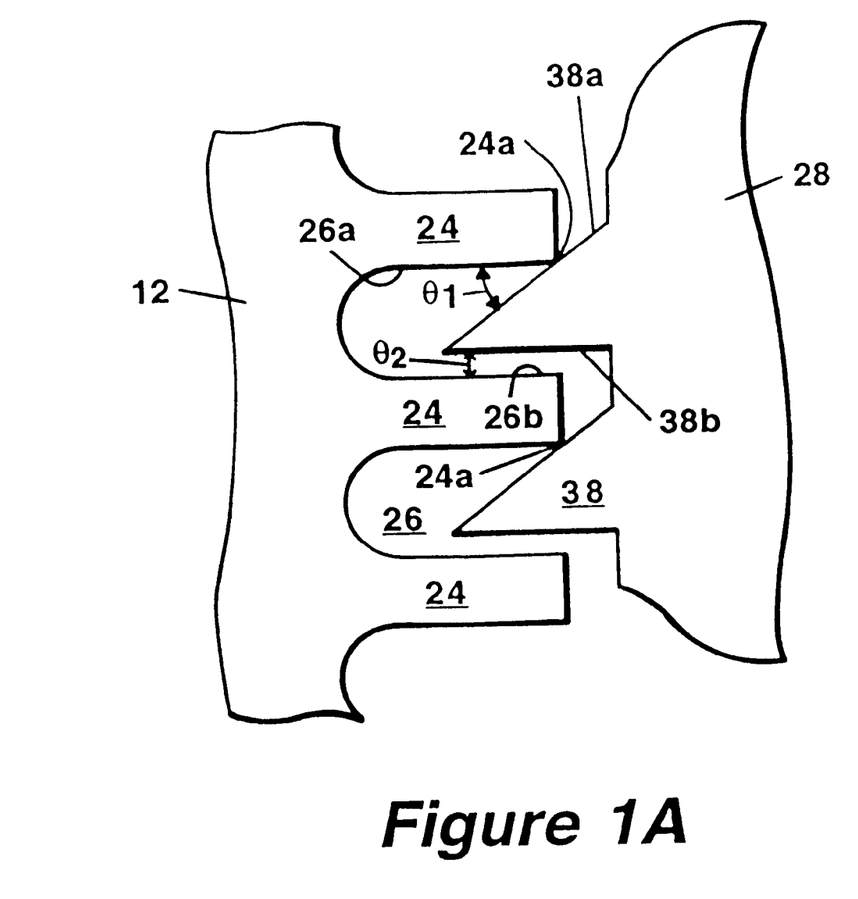
FIG. 1A, is a view of a portion of the connector assembly of FIG. 1.

As may be more clearly seen in FIG. 1A, teeth 38 are illustrated having a first edge 38a which engages at a first angle $\theta_1$ a portion of projecting member 24 which defines a first side surface 26a of recess 26 and a second edge 38b which engages at a second different angle $\theta_2$ a portion of projecting member 24 which defines a second side surface 26b of recess 26. Thus, in this embodiment, teeth 38 are provided having a shape similar to the shape of a right-triangle and recesses 26 are provided having a shape which accepts teeth 38.

Since the angled surface 38a of teeth 38 slide over projecting member surfaces 24a which define recess walls 26a, coupling nut housing 28 can be turned in a clockwise direction relative to adapter 12. Teeth surfaces 38b however, engage recess walls 26b and thus prevent coupling nut housing 28 from turning in a counterclockwise direction relative adapter 12 which would result in plug 18 becoming unscrewed from adapter 12. To unscrew coupling nut housing 28 from adapter 12, adapter 12 is held in a fixed position and coupling nut 28 is pulled away from adapter 12 by a distance which disengages teeth 38 from recesses 26 thereby allowing the coupling nut housing 28 to be turned in a counterclockwise direction to unscrew coupling nut housing 28 from adapter 12.

It should be appreciated that teeth 38 could alternatively be provided having a V-shape or sawtooth shape, a square shape or any other shape which would allow plug 18 to be locked to adapter 12. In each case, recesses 254 should be provided having a size and shape which accepts the teeth 38.

As mentioned above, when adapter 12 and plug 18 are properly mated, teeth 38 engage recessed regions 26 to provide a locking mechanism which prevents plug 18 from inadvertently separating from adapter 12. If teeth 38 were provided having a V-shape, however, it may not be necessary to pull coupling nut 28 away from adapter 12 by a distance which disengages teeth 38 from recesses 26. On the other hand, if teeth 38 were provided having a square shape, it may be necessary to pull coupling nut housing 28 away from adapter 12 by a distance which disengages teeth 38 from recesses 26 to both tighten plug 18 to adapter 12 and loosen plug 18 from adapter 12.

It should also be appreciated that other ratchet locking structures differing from that here shown may also be used to prevent disengagement of plug 18 from adapter 12. For example, recesses 26 and teeth 38 may be omitted and a ratchet structure may be provided by forming a detente in an internal portion of adapter and utilizing a spring force to engage a ball in the detente. Other ratchet structures may also be used.

Referring again to FIG. 1, when adapter 12 mates with plug 18, alignment markers 40 engage corresponding ones of marker alignment slots 32. When adapter 12 and plug 18 are properly mated (i.e. mated such that the distance between the a first end of a ferrule and a surface of a lens on an opto device are spaced by a distance which falls within a predetermined range of distances) alignment markers 40 align with band 30. Thus the combination of band 30 and alignment markers 40 provide a visual indication of whether adapter 12 and plug 18 are properly mated.

Figure 2:
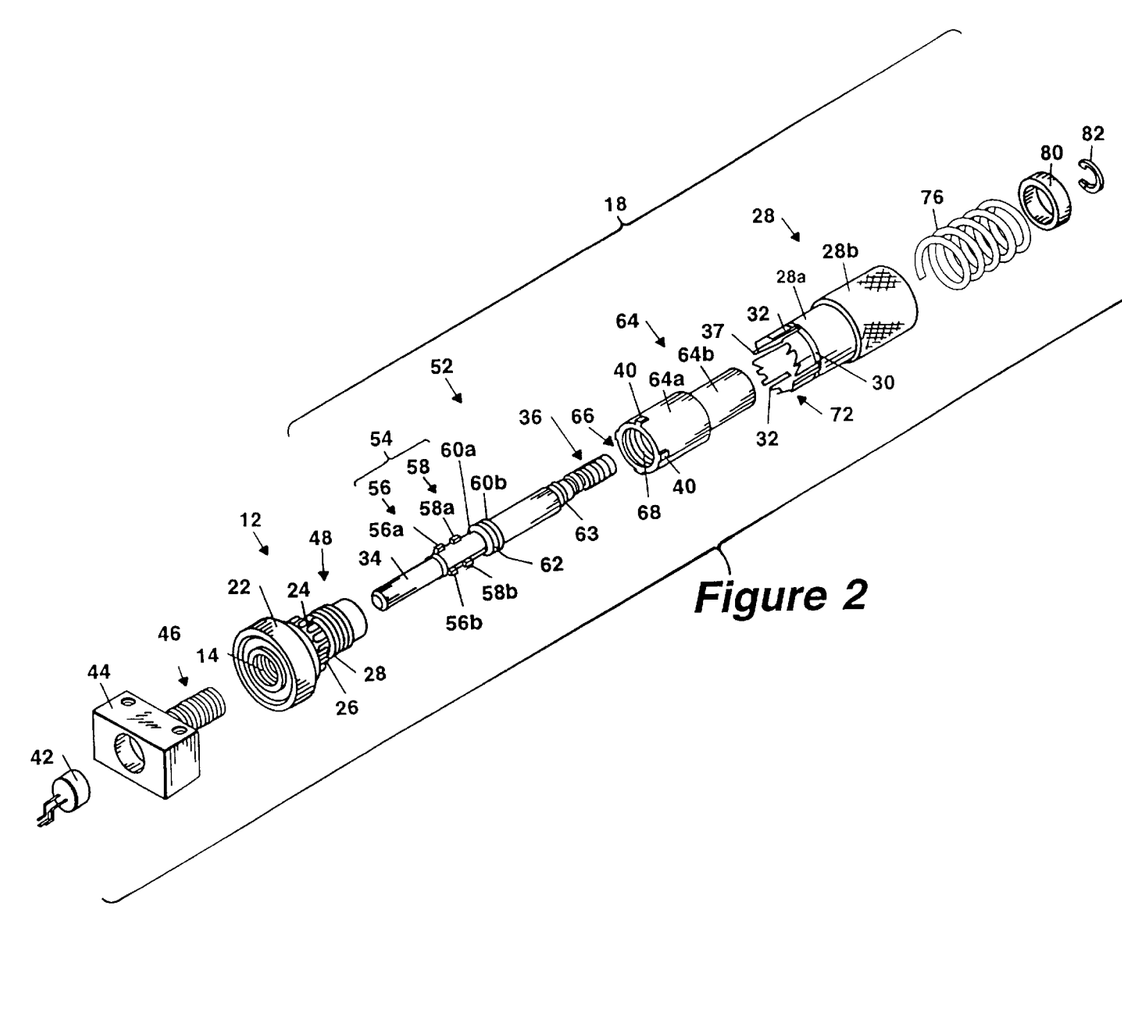
FIG. 2 is an exploded perspective a fiber optic connector assembly coupled to an SMA optical receptacle.

Referring now to FIG. 2, in which like elements of connector assembly 10 shown in FIG. 1 are provided having like reference designations, a photodiode 42 is disposed in a receptacle 44 having a threaded mating portion 46. In this particular embodiment, threaded mating portion 46 is provided as an SMA compatible threaded portion 46 and thus receptacle 44 is provided as an SMA fiber optic receptacle 44. Thus in this case, internal threads 15 of adapter 12 are dimensioned to mate with threaded portion 46 of the SMA receptacle 44.

Ferrule 34 projects from a first end of a ferrule housing 52. Ferrule housing 52 includes a key 54. In this particular embodiment, key 54 is provided from a first row of bosses 56 spaced from a second row of bosses 58. Each row of bosses 56, 58 project from an external surface of ferrule housing 52. In this view, only bosses 56a, 56b, 58a, 58b are visible, however, ferrule housing 52 may be provided having any number of bosses projecting therefrom. Bosses 56a, 56b correspond to a first pair of aligned bosses whiles bosses 56b, 58b correspond to a second pair of aligned bosses. An internal surface of adapter 12 which defines bore 14 is provided having grooves therein which provide a keyhole. When the ferrule housing 52 is disposed in bore region 14 of adapter 12, key 54 aligns with the keyhole in bore region 14 of adapter 12. Each adapter 12 may be provided having a unique keyhole pattern. Thus only a plug 18 having a corresponding keyhole pattern can mate with adapter 12.

Annular flanges 60a, 60b extend circumferentially around the ferrule housing 52 and are spaced apart to define a groove into which an O-ring 62 is disposed. When plug portion 18 is fully assembled, O-ring 62 prevents dirt and other contaminants from entering the internal regions of the plug 18. Ferrule housing 52 further includes crimp region 36 provided from a plurality of ridges formed in an external surface of ferrule housing 52.

Although key 54 is here provided from pairs of aligned bosses 56, 58, it should be appreciated that key 54 may alternatively be provided from pairs of unaligned bosses. In this instance, to insert ferrule housing 52 into adapter 12 it would first be necessary to insert ferrule housing 52 a first predetermined distance into bore 14 of adapter housing 12 such that the first row of bosses were aligned and accepted in grooves formed in an internal surface of adaptor 12. It would next be necessary to rotate ferrule housing 52 in either a clockwise or counterclockwise direction depending upon the shape of the grooves formed on an internal surface of adaptor 12 to align the second row of bosses with the grooves. Alternatively still, the pair of bosses 56, 58 could be replaced by a single continuous boss of a predetermined length which aligns with a groove formed in an internal surface of adaptor 12.

A coupling nut 64 has widened portion 64a and a narrowed portion 64b. One or more alignment markers 40 project from an external surface of widened portion 64a. A bore 66 extends through the coupling nut 64 from a first end at the widened portion 64a to a second end at the narrowed portion 64b. An internal surface which defines bore 66 in the widened portion 64a of coupling nut 64 has threads 68 formed therein. Internal threads 68 of coupling nut 64 mate with external threads 48 of adapter 12.

Coupling nut 64 is disposed within coupling nut housing 28 to provide a coupling nut assembly. Narrowed portion 28a of coupling nut housing 28 has formed in a surface thereof one or more bands 30 which intersect one or more marker alignment slots 32 also formed in the surface of coupling nut housing. The number of alignment slots 32 should be selected to be not less than the number of alignment markers 40 projecting from the widened portion 64a of coupling nut 64. A bore 72 extends through coupling nut housing 28 from a first end at the narrowed portion 28a to a second end at the knurled widened portion 28b.

A compression spring 76 is disposed within bore 72 at widened region 28b of coupling nut housing 28. As can be more clearly seen in FIG. 3, spring 76 is disposed about the narrowed coupling nut portion 28a between an internal annular shoulder 78 of coupling nut housing 28 and a retaining band 80 which is press fit over an external surface of narrowed coupling nut portion 64b. A C-shaped clip 82 disposed about the retaining region 63 of ferrule holder 52 retains ferrule 34 and ferrule holder 52 within bore 66 of coupling nut 64.

Adapter 12 is provided having internal grooves which accept keys 40 on ferrule holder 52 when the angular relationship between them is matched. If the angular relationship does not match, the ferrule 34 cannot be disposed through adapter 12 for proper mating with receptacle 44. This prevents internal threads 68 of coupling nut 64 from engaging threaded region 48 of adapter 12.

Figure 3:
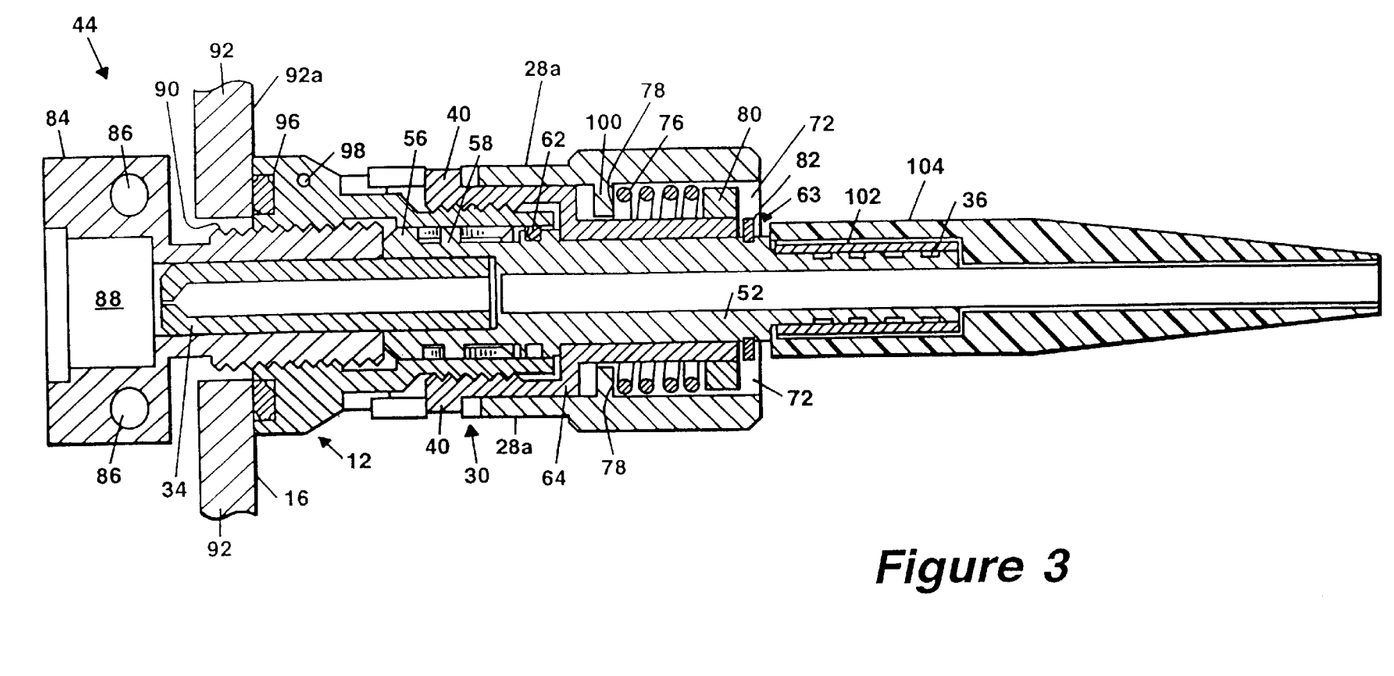
FIG. 3 is a cross-sectional view of a fiber optic connector.

Referring now to FIG. 3 in which like elements of FIGS. 1 and 2 are provided having like reference designations, connector assembly 10 is shown coupled to an SMA fiber optic receptacle 44. The manner in which connector assembly 10 is assembled and coupled to receptacle 44 is described hereinbelow.

In this particular example, SMA fiber optic receptacle 44 is provided as a so-called "card-mount" or "edge-mount" connector which, as its name implies, mounts to the edge of a printed circuit board or other mounting structure. It should be appreciated that connector assembly 10 is compatible with a variety of different types of SMA fiber optic receptacles including but not limited to "bulk-head" or "flange-mount" connectors.

The edge mount SMA fiber optic receptacle 44 includes a mounting body 84 having a pair of mounting holes 86 therethrough. Each of mounting holes 86 accept a fastener, such as a screw for example, which secures receptacle 44 to a mounting surface such as a printed circuit board (not shown). Receptacle body 84 also has a cavity 88 therein which accepts a photo diode which may be similar to photo diode 42 discussed above in conjunction with FIG. 2. Receptacle 44 also includes a member 90 projecting from a surface of mounting body 84 and having threads 46 formed thereon.

In this particular example, the threaded portion 90 of receptacle 44 projects by a predetermined distance through a housing wall 92. For clarity, only a portion of housing wall 92 is shown in FIG. 3. With receptacle 44 securely mounted to a mounting structure, adapter 12 is mated to threaded receptacle portion 90 until adapter mounting surface 16 contacts a surface 92a of housing wall 92.

A first end of ferrule 34 must be spaced by a distance within a predetermined range of distances from a surface of an optical device disposed in cavity 88. Any deviation outside this range results in a degradation in the electrical performance (e.g. an increase in insertion loss and reflection characteristic, etc . . .) of connector assembly 10 and thus degradation of the module or system in which connector assembly 10 is deployed. It should thus be noted that the thickness of housing wall 92, spacing of receptacle 44 relative to wall 92, length of threaded member 90 and any other component characteristic which affects the distance by which threaded member 90 extends from surface 92a of housing wall 92, will impact the mating of connector assembly 10 to receptacle 44 and thus impact the distance by which ferrule 34 is spaced from the surface of an optical device disposed in cavity 88.

In the event that one of the above-mentioned characteristics changes, the change may be accommodated by adjusting the length of adapter 12. For example, if the thickness of housing wall 92 increased by a predetermined amount, e.g. .100 inch (100 mils), then the overall length of adapter 12 should likewise be reduced by 100 mils to compensate for the increased thickness of wall 92 to thus maintain the relative spacing of ferrule holder 52 within adapter 12 thereby maintaining the desired spacing of ferrule 34 relative to a surface of an optical device disposed in cavity 88.

In the instant invention, band 30 and alignment marker 40 provide a visual indication of whether ferrule 34 is spaced an acceptable distance from a surface of an optical device disposed in cavity 88 (i.e. whether plug 18 is properly mated to adapter 12). If the thickness of housing wall 92 differs by more than predetermined allowable manufacturing tolerances, threaded member will extend into adapter 12 by a distance which is either greater than or less than a predetermined acceptable distance. In this case, when plug 18 is mated with adapter 12, alignment marker 40 will not align with band 30 thus providing a visual indication that the spacing of ferrule 34 relative the optical device in receptacle 44 is outside an acceptable range of spacings.

An O-ring 96 disposed in groove 17 (FIG. 1) contacts housing wall surface 92a and forms a seal between adapter 12 and wall surface 92a to prevent intrusion of contaminates into internal portions of a housing or module (e.g. module 106 in FIG. 4) to which adapter 12 is mounted. As mentioned above, the length of adapter 12 is selected for a predetermined wall thickness. Thus the length of adapter 12 is selected to ensure that threaded receptacle portion 90 extends by a predetermined distance into bore 14 of adapter 12.

Adapter 12 may be secured to receptacle 44 by placement of a sealing compound on the threaded member 90 or adapter threads 15 prior to engaging adapter threads 15 with threaded receptacle portion 90. Alternatively, adapter 12 may be secured to receptacle 44 by a safety wire (not shown). To accept a safety wire, adapter 12 is provided having at least one hole 98 therein through which the safety wire is fed. The safety wire is then fed through a hole in receptacle 44 or in a mounting structure and fastened as is generally known. In the case where a safety wire is not used, hole 98 may be omitted from adapter 12.

With the adapter 12 securely mated to receptacle 44, an optical fiber is fed through plug 18. Prior to feeding the cable through plug 18, plug 18 must be assembled. One manner in which to assemble plug 18 is as follows. First coupling nut 64 is disposed through the first end of coupling nut housing 28 in bore 72 such that respective ones of alignment markers 40 engage respective ones of slots 32.

Next, spring 72 is disposed in bore 72 at widened end 28b of coupling nut housing 28 and around narrowed portion 64b of coupling nut 64. A first end of spring 76 contacts a first surface of an inwardly extending annular flange 100 which projects from an internal surface of coupling nut housing 28. O-shaped ring 80 is press fit over the second portion 64b of coupling nut 64 to retain spring 76 under compression within coupling nut housing 28.

C-shaped ring 82 engages ferrule holder 52 in region 63 to retain ferrule 34 within coupling nut 64. Keys 54 project from the first end of plug 18. With plug 18 thus assembled, alignment markers 40 engage slots 32 in coupling nut housing 28.

Internally threaded portion 68 of coupling nut 64 mates with external threads 48 of adapter 12 thereby holding plug assembly 18 to adapter 12. The inner diameter of cylindrical bore 14 in adapter 12 is sized to allow insertion of ferrule 34 into connector 46. Bore 14 also includes a keyway having a shape corresponding to the shape of key 54 and having a size such that key 54 fits within the keyway. This allows plug 18 to be mated to adapter 12 at a particular orientation. With key 54 aligned with keyway in bore 14, as coupling nut 64 engages adapter 12, there is relative motion between coupling nut 64 and coupling nut housing 28. When coupling nut 64 is fully mated with adapter 12, alignment markers 40 in coupling nut 64 aligned with band 30 on coupling nut housing 28.

The relative motion compresses spring 76 which provides an axial force which holds angular teeth 38 in notches 26 of adapter 12 thereby preventing loosening rotation of the coupling nut 64 from adapter 12. An optical fiber (not shown) is then fed through ferrule holder 52 and epoxied in ferrule 34.

Figure 4:
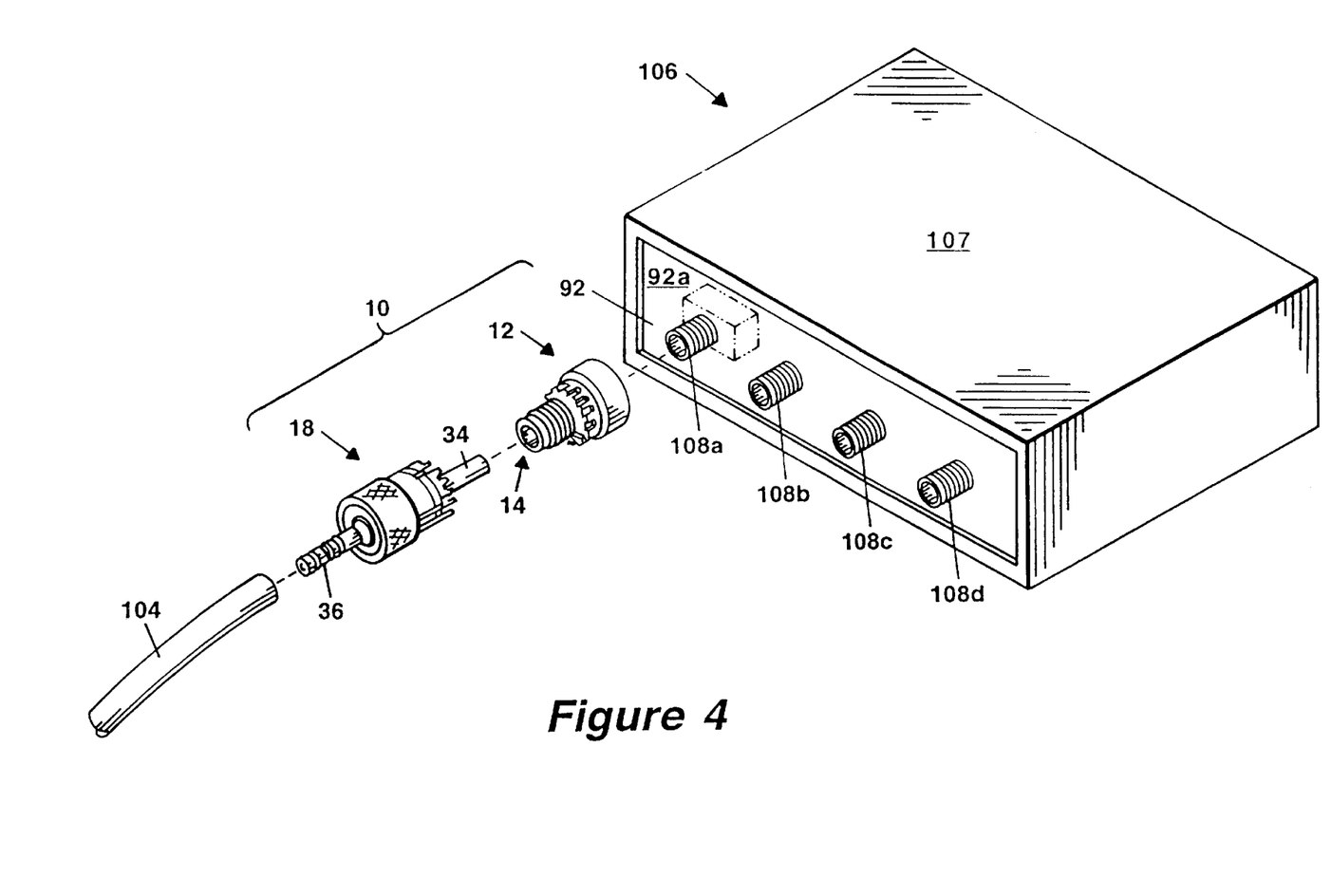
FIG. 4 is a partially exploded perspective view of a fiber optic cable coupled to a communication module through a fiber optic connector assembly.

Referring now to FIG. 4, a system module 106 includes a housing 107. Module 106 may be provided as part of a larger communication, aerospace or military system. Housing 107 includes housing wall 92 and wall surface 92a having disposed therethrough a plurality of SMA type fiber optic connectors 108a–108d generally denoted 108. Each of connectors 108 correspond to an input/output signal port of module 106 and thus are coupled to corresponding ones of a plurality of fiber optic signal paths. For clarity, only one such signal path 104 is shown in FIG. 4.

Adapter 12 having a uniquely patterned keyway formed in cylindrical bore 14 is threaded onto receptacle or connector 108a. Ferrule 34 is disposed through bore 14 to mate with connector 108a and optical fiber 104 is coupled to crimping section 36 of plug 18. Ferrule holder 52 (FIG. 2) has a key which is in the same unique pattern as the keyway formed in bore 14. Thus, plug 18 uniquely mates with adapter 12. Each of ports 108b, 108c, 108d is likewise provided having a uniquely keyed adapter 12 coupled thereto and thus, only a correspondly keyed plug 18 will properly connect thereto. In this manner, the chance of mismating an optical fiber with a port 108 is reduced.

Having described preferred embodiments of the invention, it will now become apparent to one of skill in the art that other embodiments incorporating the concepts may be used. It is felt, therefore, that these embodiments should not limited to disclose embodiments but rather should be only by the spirit and scope of the appended claims.

What is claimed is:

1. A fiber optic connector assembly for mating an optical fiber to a receptacle, the fiber optic connector assembly comprising:

(a) an adapter nut having a first end and a second end and a bore extending therethrough, a first region of the adapter bore at the first end of said adapter having threads provided therein and an external surface of the second end of said adapter having external threads provided therein; and (b) a plug separably coupled to said adapter nut, said plug comprising:
a coupling nut assembly having a first end coupled to the second of said adapter nut and a second end and having a plug bore extending therethrough, a first region of the plug bore having threads which mate with the external threads provided in the external surface of the second end of said adapter nut;
a ferrule assembly disposed in the plug bore, said ferrule assembly including a ferrule coupled to a first end thereof, said ferrule assembly disposed in the bore of said plug such that said ferrule projects into the adapter bore.

2. The fiber optic connector assembly of claim 1 wherein said coupling nut assembly is provided having an alignment band formed therein.

3. The fiber optic connector assembly of claim 2 further comprising a locking mechanism coupled to said adapter nut and said plug to prevent said plug from unmating from said adapter nut.

4. The fiber optic connector assembly of claim 3 wherein the first end of said adapter nut is provided having an O-ring groove provided therein.

5. The fiber optic connector assembly of claim 4 further comprising an O-ring disposed in the O-ring groove of said adapter nut.

6. A fiber optic adapter nut adapted to mate with a coupling nut, the adapter nut comprising:
a housing having a first end defining a first mounting surface with a groove therein, a second end with an externally threaded surface and a locking region disposed between the first and second ends;
an internal wall of said housing defining a bore extending from the first end to the second end of said housing with a portion of the bore at the first end of said housing being interiorly threaded to accept a correspondingly threaded connector and the groove surrounding an aperture provided by the bore in the first mounting surface of said housing; and
a plurality of members projecting from the external surface of said housing in said locking region, said members defining a plurality of recesses in the external locking region of said housing.

7. The fiber optic adapter of claim 6 wherein the externally threaded surface is selected to mate with an SMA connector and the internally threaded surface accepts an SMA connector.

8. A fiber optic connector plug adapted to mate with an adapter nut, the connector plug comprising:
a coupling nut housing having an external surface with an alignment band formed thereon and an internal surface which defines a bore extending from the first end to a second end of said coupling nut housing;
a coupling nut disposed within the bore of said coupling nut housing, said coupling nut having a bore therethrough with a first portion of the bore having threads provided therein;
a ferrule assembly disposed within the bore of said coupling nut, said ferrule assembly including a ferrule; and
a ferrule retaining member, coupled to said ferrule assembly for retaining said ferrule assembly within the bore of said coupling nut.

9. The fiber optic connector plug of claim 8 wherein the threads in the bore of said coupling nut mate with threads on the adapter nut.

10. A fiber optic connector assembly for mating an optical fiber to a connector of a module, wherein the connector is disposed through a wall of the module with a first portion of the connector projecting past a surface of the wall by a predetermined distance and with the first portion of the connector having an external surface having SMA compatible threads formed therein, the fiber optic connector assembly comprising:

(a) an adapter having a first end with an O-ring groove provided in an end surface of the first end of said adapter and having a second end and having a bore extending from the first end to the second end, a first region of the bore at the first end of said adapter having SMA compatible threads provided therein to mate with the SMA compatible threads provided in the external surface of the connector, and an external surface of the second end of said adapter having external threads provided therein and wherein said adapter has a unique mechanical characteristic;

(b) an O-ring disposed in the O-ring groove provided in the end surface of the first end of said adapter;

(c) a plug separably coupled to said adapter, said plug having a first end and a second end and having a plug bore extending therethrough, a first region of the plug bore in the first end of said plug having threads adapted to mate with the external threads provided in the external surface of the second end of said adapter and said plug having a unique mechanical characteristic which is complimentary to the unique mechanical characteristic of said adapter such said plug can mate with said adapter; and (d) an alignment band formed in an external surface of said plug; and (e) a locking mechanism to prevent the plug from separating from the adapter in response to a vibration force.

11. A fiber optic connector assembly for mating an optical fiber to a receptacle, the fiber optic connector assembly comprising:

(a) an adapter having a first end and a second end and a bore extending therethrough, a first region of the adapter bore at the first end of said adapter having threads provided therein and an external surface of the second end of said adapter having external threads provided therein; and (b) a plug separably coupled to said adapter, said plug having an alignment band formed on an external surface thereof, having a first end adapted to couple to the second end of said adapter, having a second end and having a plug bore extending from the first end to the second end, a first region of the plug bore having threads which mate with the external threads provided in the external surface of the second end of said adapter.

12. The fiber optic connector assembly of claim 11 further comprising a locking mechanism coupled to said adapter and to said plug to prevent said plug from unmating from said adapter in response to a vibration force.

13. The fiber optic connector assembly of claim 12 wherein the first end of said adapter is provided having an O-ring groove provided therein.

14. The fiber optic connector assembly of claim 13 further comprising an O-ring disposed in the O-ring groove of said adapter.

15. The fiber optic connector assembly of claim 14 further comprising a ferrule assembly disposed in the plug bore, said ferrule assembly including a ferrule coupled to a first end thereof, said ferrule assembly disposed in the bore of said plug such that said ferrule projects into the adapter bore.

16. A system module comprising:

a housing including a housing wall and a wall surface;

a connector corresponding to an input/output signal port of the module said connector disposed through the housing wall and having a portion projecting past the wall surface by a predetermined distance;

an adapter having a first end coupled to said connector with a first surface of the first end of said adapter contacting the wall surface of the housing wall;

a sealing member disposed between the first surface of said adapter and the wall surface;

a plug having a first end, a second end and an external surface with the first end of said plug adapted to be separably coupled to a second end of said adapter; and an optical fiber coupled to the second end of said plug.

17. The system module of claim 16 wherein said sealing member comprises:

O-ring groove provided in the first surface of said adapter; and an O-ring disposed in the O-ring groove.

18. The system module of claim 17 wherein said plug further comprises an alignment band formed on the external surface of said plug.

19. The system module of claim 18 wherein:

the portion of said connector projecting past the wall surface by a predetermined distance has an externally threaded surface;

the first end of said adapter has an internally threaded surface which mates with the externally threaded surface of said connector; and the first end of said plug has an internally threaded surface which mates with an externally threaded surface of the second end of said adapter thereby holding said plug to said adapter.

20. The system module of claim 19 wherein said connector is an SMA type fiber optic connector.

21. The system module of claim 20 further comprising a locking mechanism to prevent the plug from separating from the adapter in response to the module being exposed to a vibration force.

22. The system module of claim 21 wherein:

said connector is a first one of a plurality of connectors each of said plurality of connectors disposed through the wall of said module and projecting from a surface thereof;

said adapter is a first one of a plurality of adapters each of said plurality of adapters having a unique mechanical characteristic and each of said adapters coupled to one of said plurality of connectors;

said plug is a first one of a plurality of plugs each of said plurality of plugs having a unique mechanical characteristic which is complimentary to the unique mechanical characteristic of a predetermined one of said plurality of adapters such that each of the plurality of plugs will mate with only one of said plurality of adapters.

23. The system module of claim 22 wherein:

the second end of each of said plurality of adapters is provided having a different diameter; and the first end of each of said plurality of plugs is provided having a diameter selected such that each of said plugs can mate with only one of said plurality of adapters.

* * * * *

UNITED STATES PATENT AND TRADEMARK OFFICE
CERTIFICATE OF CORRECTION

PATENT NO : 6,062,739
DATED : May 16, 2000
INVENTOR(S) : Blake et al.

It is certified that error appears in the above-identified patent and that said Letters Patent are hereby corrected as shown below:

Col. 6, line 5   delete "a" (first occurrence).

Col. 9, line 59 insert "be" after "not".

Signed and Sealed this

Seventeenth Day of April, 2001

Attest:

NICHOLAS P. GODICI

*Attesting Officer*     *Acting Director of the United States Patent and Trademark Office*